United States Patent [19]

Harrison

[11] 4,049,296
[45] Sept. 20, 1977

[54] LEAK REPAIR CLAMP

[75] Inventor: George W. Harrison, Alvin, Tex.

[73] Assignee: Team, Inc., Alvin, Tex.

[21] Appl. No.: 682,485

[22] Filed: May 3, 1976

[51] Int. Cl.$^2$ ............................................. F16L 55/16
[52] U.S. Cl. ........................................ 285/15; 138/99;
    285/110; 285/294; 285/363; 285/379
[58] Field of Search ................. 285/15, 110, 379, 373,
    285/111, 112, 197, 190; 138/99; 277/207 A,
    189, 215, 216, 217, 220, 170, 205

[56] References Cited

U.S. PATENT DOCUMENTS

| 518,805 | 4/1894 | Cooper | 138/99 |
|---|---|---|---|
| 549,594 | 11/1895 | Cooper et al. | 285/112 X |
| 1,903,029 | 3/1933 | Damsel | 138/99 X |
| 2,417,741 | 3/1947 | Dillon | 138/99 |
| 2,434,107 | 1/1948 | Folsom | 285/110 X |
| 2,490,907 | 12/1949 | Kellaher et al. | 285/379 X |
| 3,151,631 | 10/1964 | Yano | 285/379 X |
| 3,550,638 | 12/1970 | Smith | 285/373 X |
| 3,603,508 | 9/1971 | Ingram et al. | 285/190 X |
| 3,603,616 | 9/1971 | Smith | 285/15 |
| 3,664,691 | 5/1972 | Nakamura | 285/112 |
| 3,770,301 | 11/1973 | Adams | 285/15 |
| 3,791,678 | 2/1974 | De Putter | 285/379 X |
| 3,954,288 | 5/1976 | Smith | 285/373 X |
| B 313,280 | 4/1976 | Schuldink | 285/379 X |

FOREIGN PATENT DOCUMENTS

| 256,464 | 12/1927 | Italy | 285/379 |
|---|---|---|---|
| 215,885 | 5/1924 | United Kingdom | 277/189 |

Primary Examiner—Thomas F. Callaghan
Attorney, Agent, or Firm—Guy E. Matthews

[57] ABSTRACT

In one exemplar embodiment, a leak repair clamp for pipe and pipe flanges, valve bonnet flanges and the like is disclosed having a divided clamp frame positionable about the pipe or pipe flange. The divided clamp frame has a pair of spaced parallel channels disposed about its inner periphery. Deformable self-energizing seal members are disposed in each of the channels and having a flexible sealing tip portion radially extending from the inner periphery of the clamp frames. A retaining member is disposed in each of the channels adjacent the seal member for engaging the seal and the channel and retaining the seal member fixed within the channel. A means for clamping the divided clamp frame about the pipe is actuated for applying compressive force between the pipe or pipe flange and the flexible sealing tip portion of the parallel sealing members to compress and deform the tip portions of the parallel seal members for affecting a self-sealing sealed area encircling the pipe or pipe flanges to effectively seal off the leak.

1 Claim, 7 Drawing Figures

FIG. 3A
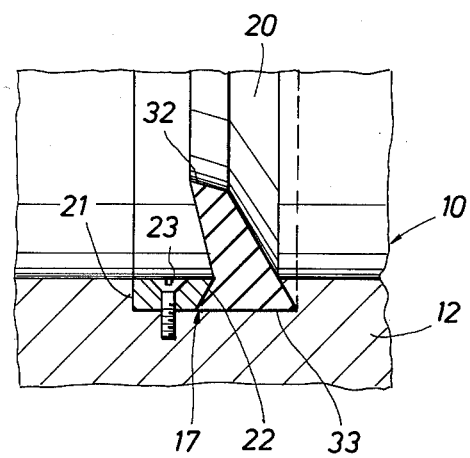
FIG. 3B
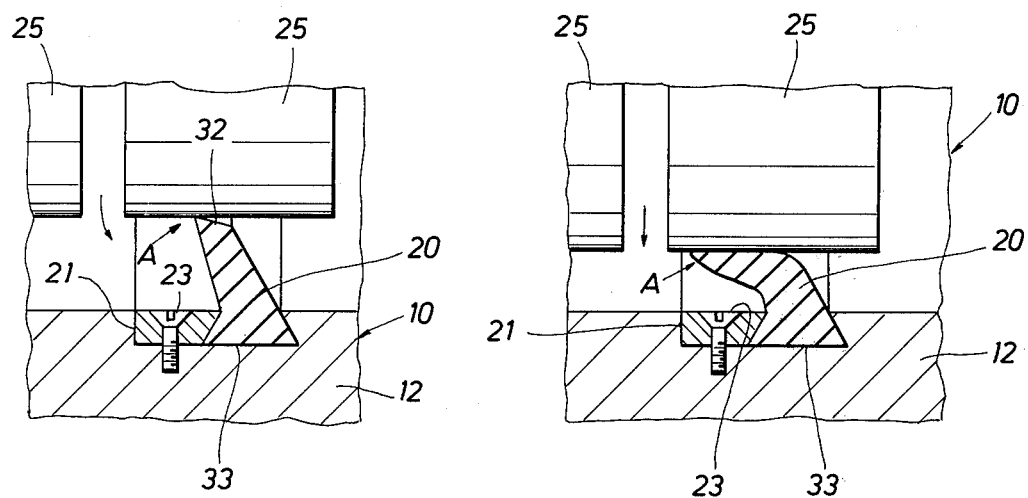
FIG. 3C
FIG. 4
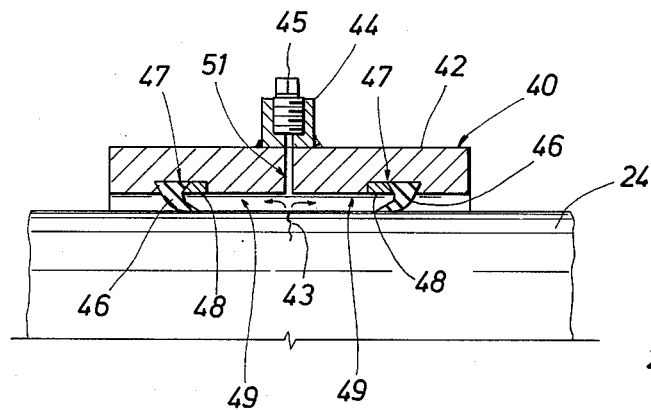
FIG. 5
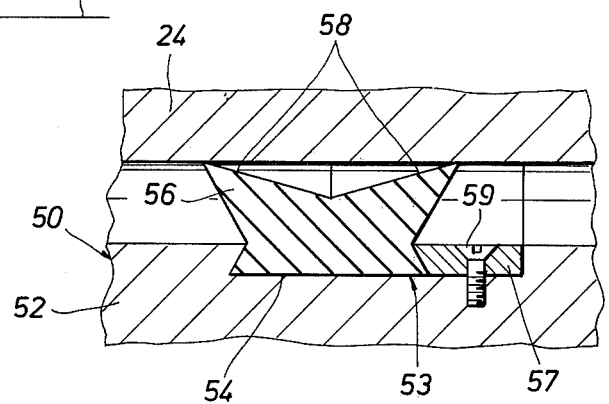

LEAK REPAIR CLAMP

BACKGROUND OF THE INVENTION

This invention relates generally to means for repairing pipe line leaks and, more particularly to a leak repair clamp for sealing leaking flange pipe couplings, valve bonnet flanges, or leaks through the exterior of a pipe section wall.

Flanged pipe couplings are widely used for connecting together sections of pipe in larger sizes and operating in moderate to high pressures. Various configurations of seals are utilized between the flanges, but one of the most common forms is to provide a raised face on the inner portion of each of the flange faces between which an annular gasket is placed, and, when the flanges are bolted together, the raised faces plus the gasket material tighten between them to form a seal.

However, such flange pipe couplings may often begin to leak, because of deterioration of the gasket material or shifting of the pipe, or for other reasons. Similarly, a leak may occur in the outer wall of a pipe section due to a defect in the manufacture of the pipe, or because of damage to the pipe during or after installation. Such leaks must be repaired, and often in the past the pipe line had to be shut down and drained of its contents before such a leak could be repaired. The prior art shows pipe flange repair clamps, such as those disclosed in U.S. Pat. Nos. 866,395 and 3,152,816, for sealing the leak between pipe flanges. However, these flange repair clamps are extremely complex and have a number of movable and adjustable parts that make the clamp expensive and difficult to utilize.

To repair leaks in pipe lines or around weld joints, outer sleeves that are specially made and custom fitted to the particular pipe line have been used. They are set over the leak, clamped or welded together, and then the interior of the sleeves has been filled with a sealant material. However, the custom making of such sleeves is extremely expensive, and their attachment to pipe sections is time consuming, tedious and expensive.

Accordingly, one primary feature of the present invention is to provide a repair clamp for pipe and pipe flanges and the like that utilizes a self-energizing seal to speed the leak repair action.

Another feature of the present invention is to provide a simple clamp that can be utilized with minor modifications, both for sealing leaks in pipe lines or pipe line sections and pipe flanges.

Yet another feature of the present invention is to provide a leak repair clamp that utilizes a compression seal that can be self-energizing, used in high temperatures, and in applications where the product leaking from the pipe line or flange is corrosive.

SUMMARY OF THE INVENTION

The present invention remedies the problems of the prior art by providing a leak repair clamp for pipe and pipe flanges, valve bonnet flanges and the like, comprising a divided clamp frame that is positionable about the pipe or the pipe flange and having a pair of spaced parallel channels disposed about the inner periphery of the clamp frame. Deformable self-sealing seal members are disposed in each of the channels and have a flexible sealing tip portion radially extending from the channels and the inner periphery of the frame. A retaining means is disposed in each of the channels adjacent the seal member for engaging the seal member and the channel and retaining the seal member in place. Means for clamping the divided clamp frames together is provided and applies compressive force between the pipe or pipe flange and the flexible sealing tip portions of the parallel sealing members to compress and deform the tip portions of the parallel seal members against the pipr or pipe flange for affecting a self-sealing sealed area encircling the pipe and containing the leak. A sealant may be injected through the pipe frame into the sealed area encircling the pipe or pipe flange for effectively sealing the leak.

BRIEF DESCRIPTION OF THE DRAWINGS

In order that the manner in which the above-recited advantages and features of the invention are attained can be understood in detail, a more particular description of the invention may be had by reference to specific embodiments thereof which are illustrated in the appended drawings, which drawings form a part of this specification. It is to be noted, however, that the appended drawings illustrate only typical embodiments of the invention and are therefore not to be considered limiting of its scope for the invention may admit to further equally effective embodiments.

In the drawings:

FIGS. 3A, 3B and 3C are a series of enlarged partial, vertical, cross-sectional views of the seal member deforming against the pipe flanges as the divided clamp frame is clamped together to form the leak repair seal.

FIG. 4 is a partial detailed vertical, cross-sectional view of the leak repair clamp according to this invention mounted on a pipe line to seal a pipe section leak.

FIG. 5 is an enlarged partial, vertical, cross-sectional view of a second embodiment of the seal member according to this invention.

DETAILED DESCRIPTION OF THE PREFERRED EMBODIMENTS

Figure 1:
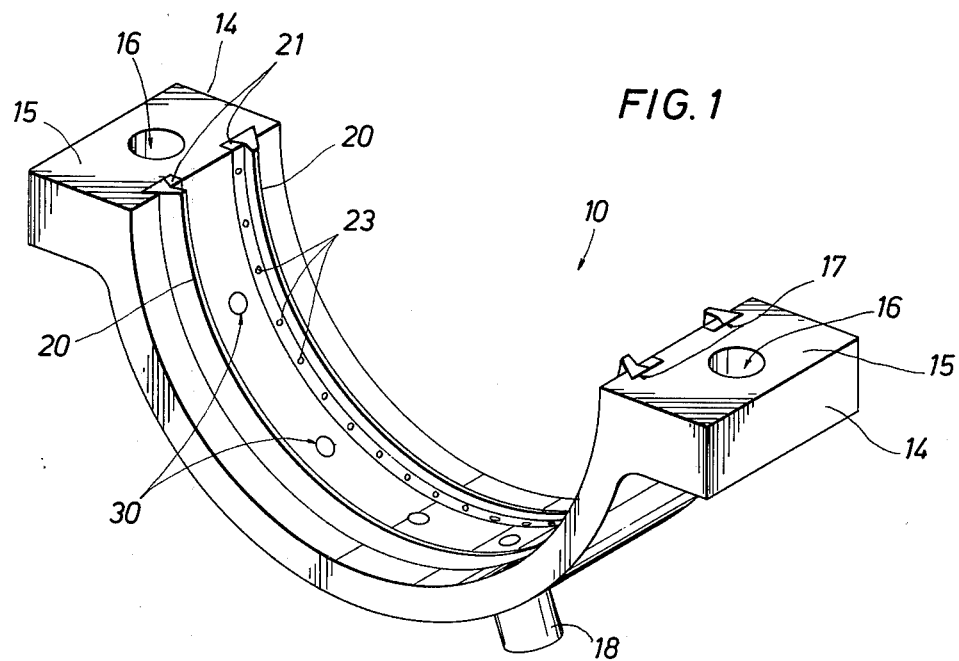
FIG. 1 is a perspective view of one-half of the divided clamp frame of the leak repair clamp according to this invention.

Referring now to FIG. 1, a perspective view of a leak repair clamp 10 for pipe and pipe flanges and the like is shown. The clamp 10 comprises a pair of semi-circular clamp frame sections 12 terminating in end flanges 14 in which are disposed apertures or bolt holes 16 for joining the divided clamp frame 12 together. The inner semi-circular faces of divided clamp frame 12 have disposed therein a pair of spaced parallel channels 17 into which are disposed sealing members 20 which are retained in place by means of seal retaining members 21, which are held in place by means of conventional fasteners such as screws 23 or spot welds or the like. A plurality of radial apertures 30 are disposed through the body of the divided clamp frame 12 and communicate with the interior surface of the clamp frame 12 between the spaced seal members 20. The outer end of the apertures 30 terminates in a nipple 18 for purposes to be hereinafter further described.

Figure 2:
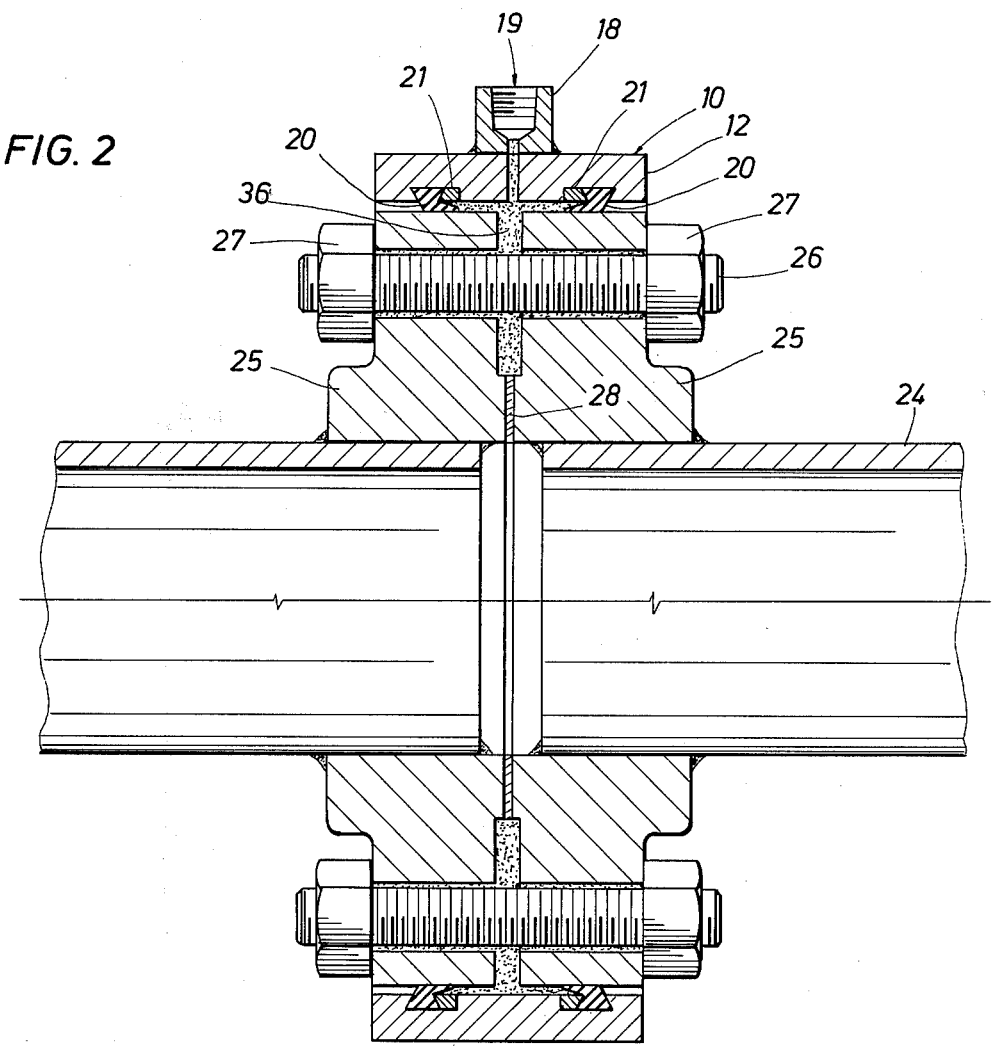
FIG. 2 is a detailed vertical cross-sectional view of the leak repair clamp according to this invention mounted on a pipe line to seal a pipe flange leak.

FIG. 2 shows a leak repair clamp 10 according to the present invention disposed on pipe line 24 about adjacent abutting pipe flanges 25 for sealing a leak through the pipe flange connection. The flanges 25 of pipes 24 are held securely together by means of a flange bolt 26 and flange bolt nuts 27 which compress the flanges 25 against a flange gasket 28 for sealing the ends of the two pipe line sections 25 together. If there is a leak through gasket 28 and through the flange connection, leak repair clamp 10 can seal such a leak when shown in the position shown in FIG. 2. The divided clamp frame 12 is placed about the periphery of adjacent pipe flanges 25 and centered thereon with the spaced seal members 20 in contact with the outer surface of each of the pipe flange 25. When the means (not shown) for clamping the divided clamp frames together is actuated, such as a bolt and nut combination, a compressive force is applied between the outer surface of pipe flanges 25 and the seal members 20 for compressing and deforming the tip portion of the seal members inwardly toward the adjacent parallel seal member and effecting a self-sealing sealed area encircling the pipe flanges between the spaced sealed members. An appropriate sealant can be introduced by means of a pressurized system, which can be fitted to the threaded end of nipple 18 to introduce sealant through the nipple threaded opening 19, the sealant aperture 30 and into the sealed area encircling the pipe. The shaded portion 36 illustrates the area that would be sealed by a pressurized sealant to seal the space between the flanges and flange bolts and the leak repair clamp for effecting a positive seal of any pipe flange leak.

The end flange surface 15 of clamp frames 12 are machined to form an end seal for the clamp when assembled in place. In addition, sealant introduced into the area between elastomer seals 20 will be forced into any joint between adjacent contacting end flange surfaces 15 to effect a seal between the pair of divided clamp frame 12 sections.

FIGS. 3A, 3B and 3C illustrate the stages of compression of the seal member 20 and its self-sealing characteristics. In FIG. 3A, a portion of the divided clamp frame 12 of a leak repair clamp 10 as previously described is shown. Channel 17 is disposed in the inner surface of divided clamp frame 12 and disposed therein as a deformable self-sealing seal member 20 comprising a wedge-shaped base member or base end 33 and a flexible sealing tip portion 32 radially extending from the base end 33 and projecting above the inner periphery of clamp frame 12. The sealing tip portion 32 of seal member 20 is biased or slanted toward the adjacent parallel seal member 20 as shown, and for purposes to be hereinafter further described. The seal retaining member 21 is adapted for disposition in channel 17 and has a longitudinal edge 22 adapted to mate with the wedge-shaped base end 33 of seal member 20 for engaging and retaining the seal member in respective channels 17. The retaining member working in conjunction with a fastening means, such as screws 23, forms a retaining means disposed in each of the channels 17 adjacent the seal member 20 for engaging one edge of the base end 33 of seal member 20 and the channel 17 for retaining the seal member therein.

FIGS. 3B and 3C show the sealing action of the deformable self-sealing seal member 20 as the divided clamp frame is clamped about either a pipe section 24, or as shown in the figures, a pipe flange portion 25 or adjacent pipe flange portions 25. A means (not shown) for clamping the divided clamp frame about the pipe flanges 25 applies compressive force between the pipe flanges 25 and the flexible sealing tip portion 32 of seal member 20, the seal member 20 is compressed, and the tip portion 32 is deformed inwardly toward the adjacent parallel seal member 20 (see FIG. 3C) for effecting a self-sealing sealed area between the seal members and encircling the pipe or pipe flanges 25.

As the flexible tip portion 32 of seal member 20 is compressed against the outer surface of pipe flange 25, pressure from the leak within or between the flanges is directed toward the outer edge of the flexible tip portion 32 as shown by the arrow at A, forcing the outer edge of the flexible tip portion 32 tightly against the outer surface of pipe flange 25, thereby effecting a positive self-energizing seal. Thus, even if the outer surface of the pipe flange 25 is indented or pitted or is not a true cylindrical shape, the outer edge of the flexible tip portion 32 will nevertheless be self-energized into such variations in the contour of the outer surface of pipe flange 25 by the pressure differential between the area between the seal members 20 and the area outside of the seal members 20. The seal member 20 may be made of any deformable material that will have the capability of allowing the sealing tip portion 32 to be flexible and effect the self-sealing characteristic just described. Several synthetic resin materials such as polyethylene may be utilized.

Referring now to FIG. 4, a leak repair clamp 40 is shown in position on a pipe section 24 for sealing a leak 43 in the pipe wall. A divided clamp frame 42 is shown having disposed about the inner periphery thereof a pair of spaced parallel channels 47 into which are disposed deformable seal members 46 and retaining means 48 for engaging the seal members and the channel and retaining the seal members therein. The divided clamp frame sections 42 are clamped together, thus applying compressive force between the outer surface of pipe 24 and the deformable seal members 46 to compress and deform the tip portions 32 of the seal members 46 toward the adjacent parallel seal member 46 and effect a sealed area 49 encircling the pipe and effectively sealing the pipe leak 43. As hereinabove described with regard to the previous embodiment, a suitable sealant may be introduced through nipple 44 by removing nipple sealing screw 45 and introducing the sealant through nipple 44 and the sealant aperture 51 into the sealed area 49 encircling the pipe and thus closing the pipe leak 43.

FIG. 5 illustrates a second embodiment of the deformable seal member that may be utilized in special applications. A leak repair clamp 50 is shown having divided clamp frames 52 which have disposed within their inner periphery channels 53, similar to or identical to the previous embodiments hereinabove described. However, into channel 53 is disposed a deformable seal member 56 having a wedge-shaped base 54 and having a pair of opposed flexible tip ends 58 spaced from the wedge-shaped base 54. A retaining member 57 and conventional fastening means such as screws 59 combine to form a retaining means for engaging the base 54 of seal 56 and retaining it within channel 53.

As the means for clamping the divided clamp frames 52 about the pipe are actuated, a compressive force will be applied between the pipe surface 24 and the pair of flexible sealing tip portions 58, thereby compressing the seal member 56 and deforming the respective tip portions 58 outwardly to effect a self-energizing or self-sealing seal. The embodiment shown as seal member 56 is particularly useful for high temperature applications. It may be necessary to use a seal member made of an asbestos braid for high temperature applications, or use a synthetic resin material, such as a flurocarbon resin material that can withstand corrosive materials or products. Some deformable metals can be utilized under certain applications, like copper, aluminum, or stainless steel. Of course, the seal member 56 may be made of any suitable material that has the properties of deformation and self-sealing or self-energizing as hereinabove described.

Numerous variations and modifications may obviously be made in the structure herein described without departing from the present invention. Accordingly, it should be clearly understood that the forms of the invention herein described and shown in the figures of the accompanying drawings are illustrative only and are not intended to limit the scope of the invention.

What is claimed is:

1. A leak repair clamp for pipe and pipe flanges and the like, comprising a frame having a plurality of frame segments positionable in end-to-end relation about the pipe, each segment having spaced parallel annular recesses about its inner periphery and a flange on each end, a deformable self-sealing seal member having a base portion which is dove-tailed shape and a flexible sealing tip portion for bending over in order to extend toward the other sealing tip portion when sealed about the pipe extending inwardly from said base portion, retaining means connected to each segment for retaining the base portion of a seal member within each recess by a fastener which is threadably connected to the recess on the inner side of the base portion so as to underlie at least a portion of the bent-over sealing tip portion, the recess and retaining means having tapered end walls which form a dove-tailed channel with the bottom wall of the recess to fit tightly against the end and bottom walls of the base portion of the seal member, and means for connecting the frame segments to one another with the end faces of said flanges being brought into metal-to-metal sealing engagement when positioned in end-to-end relation about the pipe, so as to clamp the frame about the pipe and thereby cause the sealing tip portions of the seal members to be deformed into sealing engagement about the pipe on opposite sides of the leak as the frame is so clamped.

* * * * *